United States Patent
Razi et al.

(10) Patent No.: US 11,388,013 B2
(45) Date of Patent: Jul. 12, 2022

(54) SECURING DISTRIBUTED ELEMENTS CONNECTED TO A NETWORK WITH ADDRESSABLE PHYSICALLY UNCLONABLE FUNCTIONS

(71) Applicant: Arizona Board of Regents on Behalf of Northern Arizona University, Flagstaff, AZ (US)

(72) Inventors: Abolfazl Razi, Flagstaff, AZ (US); Bertrand Francis Cambou, Flagstaff, AZ (US)

(73) Assignee: ARIZONA BOARD OF REGENTS ON BEHALF OF NORTHERN ARIZONA UNVERSITY, Flagstaff, AZ (US)

( * ) Notice: Subject to any disclaimer, the term of this patent is extended or adjusted under 35 U.S.C. 154(b) by 488 days.

(21) Appl. No.: 16/494,100

(22) PCT Filed: Mar. 30, 2018

(86) PCT No.: PCT/US2018/025516
§ 371 (c)(1),
(2) Date: Sep. 13, 2019

(87) PCT Pub. No.: WO2018/183926
PCT Pub. Date: Oct. 4, 2018

(65) Prior Publication Data
US 2022/0166638 A1     May 26, 2022

Related U.S. Application Data

(60) Provisional application No. 62/480,200, filed on Mar. 31, 2017.

(51) Int. Cl.
H04L 29/06    (2006.01)
H04L 9/32     (2006.01)

(52) U.S. Cl.
CPC .................................. *H04L 9/3278* (2013.01)

(58) Field of Classification Search
CPC ....................................................... H04L 9/3278
See application file for complete search history.

(56) References Cited

U.S. PATENT DOCUMENTS

| | | | | |
|---|---|---|---|---|
| 8,667,265 | B1* | 3/2014 | Hamlet | H04L 9/3278 713/185 |
| 2013/0276059 | A1* | 10/2013 | Lewis | G06F 21/73 726/2 |
| 2014/0108786 | A1* | 4/2014 | Kreft | G06F 21/335 713/194 |
| 2014/0279532 | A1* | 9/2014 | Tremlet | G06Q 20/40 705/325 |
| 2015/0007353 | A1* | 1/2015 | Franciscus Widdershoven | H01L 23/576 726/34 |
| 2015/0058928 | A1* | 2/2015 | Guo | H04L 63/0876 726/30 |
| 2015/0195088 | A1* | 7/2015 | Rostami | H04L 9/3278 380/28 |
| 2019/0305942 | A1* | 10/2019 | Cambou | H04L 9/0852 |

(Continued)

*Primary Examiner* — Gary S Gracia
(74) *Attorney, Agent, or Firm* — Quarles & Brady LLP (57) ABSTRACT

The present disclosure is related to implementations of computing systems. In particular, it is related to the use of an array of PUFs to enhance security of distributed elements that use security systems.

20 Claims, 8 Drawing Sheets

(56) References Cited

U.S. PATENT DOCUMENTS

| | | | |
|---|---|---|---|
| 2019/0354672 A1* | 11/2019 | Cambou | G06F 21/45 |
| 2020/0045033 A1* | 2/2020 | Flikkema | H04L 9/3278 |
| 2020/0076624 A1* | 3/2020 | Cambou | H04L 9/3239 |

* cited by examiner

SECURING DISTRIBUTED ELEMENTS CONNECTED TO A NETWORK WITH ADDRESSABLE PHYSICALLY UNCLONABLE FUNCTIONS

CROSS REFERENCE TO RELATED APPLICATIONS

This application is a U.S. National Stage of PCT Application No. PCT/US18/25516 filed on Mar. 30, 2018, which claims priority to U.S. Provisional Application Ser. No. 62/480,200 entitled "Securing Distributed Elements Connected to a Network with Addressable PUFs" filed on Mar. 31, 2017, the disclosure of which is hereby incorporated entirely herein by reference.

FIELD OF THE INVENTION

The present disclosure is related to implementations of computing and security systems. In particular, it is related to the use of an array of physically unclonable functions (PUFs) to enhance security of distributed elements that use security systems.

BRIEF DESCRIPTION OF THE DRAWINGS

The present disclosure is illustrated by way of examples, embodiments, and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION OF PREFERRED EMBODIMENTS

This disclosure is related to the use of an array of physically unclonable functions (PUFs) to enhance security of distributed elements such as subscriber identity module (SIM) cards, UMTS SIM (USIM), embedded SIM (eSIM), ID cards, secure microcontrollers, internet of things (IoT), smart phones, laptop and desktop computers, and any peripheral devices connected to a network. Currently, in many network communication systems secure elements of those systems are exposed to side-channel attack when a static secret key stored in particular device or component is compromised. In contrast to those conventional systems, the methods and system of the current disclosure use a set of protocols based on addressable PUF generators (APG) that may operator to protect distributed network elements or components. In the present approach, dynamic secure keys generated by a device's APG do not require the storage of a database of passwords or secret keys in a distributed element and may thereby be immune to traditional database hacking attacks. The secure keys generated in the process can be changed dynamically after each authentication cycle in such a way that if a particular key is compromised, the impact can be limited to the event. For example, two keys can be generated at every step of a communication process, with the first key operating to protect the distributed element, and the second key to protect the network or a network device (e.g., a server computer) with which the distributed element is communicating. APGs can be designed with simple memory arrays with a large number of addressable PUFs to generate a large number of secret keys for cryptographic protocols with a relatively large amount of entropy as compared to conventional systems.

Computer networks are faced with the task of communicating in a secure way with trustworthy distributed elements. The essence of access control is to match a password, secret key, biometric print, or any other reference pattern associated with a particular user or distributed element against the same reference pattern that is stored in the secure host or the distributed element. This invention relates to communication between a secure host and distributed elements that are protected by cryptographic methods such as public key infrastructure (PKI) with RSA security, elliptic curve cryptography (ECC), or any alternate protocols.

PUFs are part of a set of cryptographic primitives that can generate the equivalent complexity of human DNA or fingerprints to strengthen the level of security of authentication protocols. PUFs exploit the manufacturing variations that are introduced during the fabrication of devices, such as local variations in doping levels of semiconducting layers which make each device identifiable from each other. The underlying mechanism of PUFs is the creation of a large number of Challenge (i.e., input) Response (i.e., output) Pairs (CRPs). Once deployed during the authentication cycles, the PUFs are queried with challenges; the authentication is positive when the rate of matching CRPs is sufficiently high.

Memory arrays serve as elements to construct PUFs. Usually PUFs need only 128 to 256 bits, while commercial secure memory arrays (SM) which are integrated within secure micro-controllers may have memory densities in the megabyte range. One embodiment of the method to generate CRPs characterizes a particular parameter P of the cells of the memory array with a "built-in-self-test" BIST module. For example, given a particular input voltage to the cell, the cell will generate a particular output voltage, this is considered the parameter P. As each cell is different, the value of parameter P varies from cell to cell based upon the input to the cell and follows a distribution with a median value T. For challenge and response generation, all cells with a P value below T can be then considered as "0", and all other cells labeled as "1". The resulting streams of data generated by this method can be used as cryptographic primitives to authenticate the memory array because the cells randomly vary between arrays due to the manufacturing variations.

Figure 1:
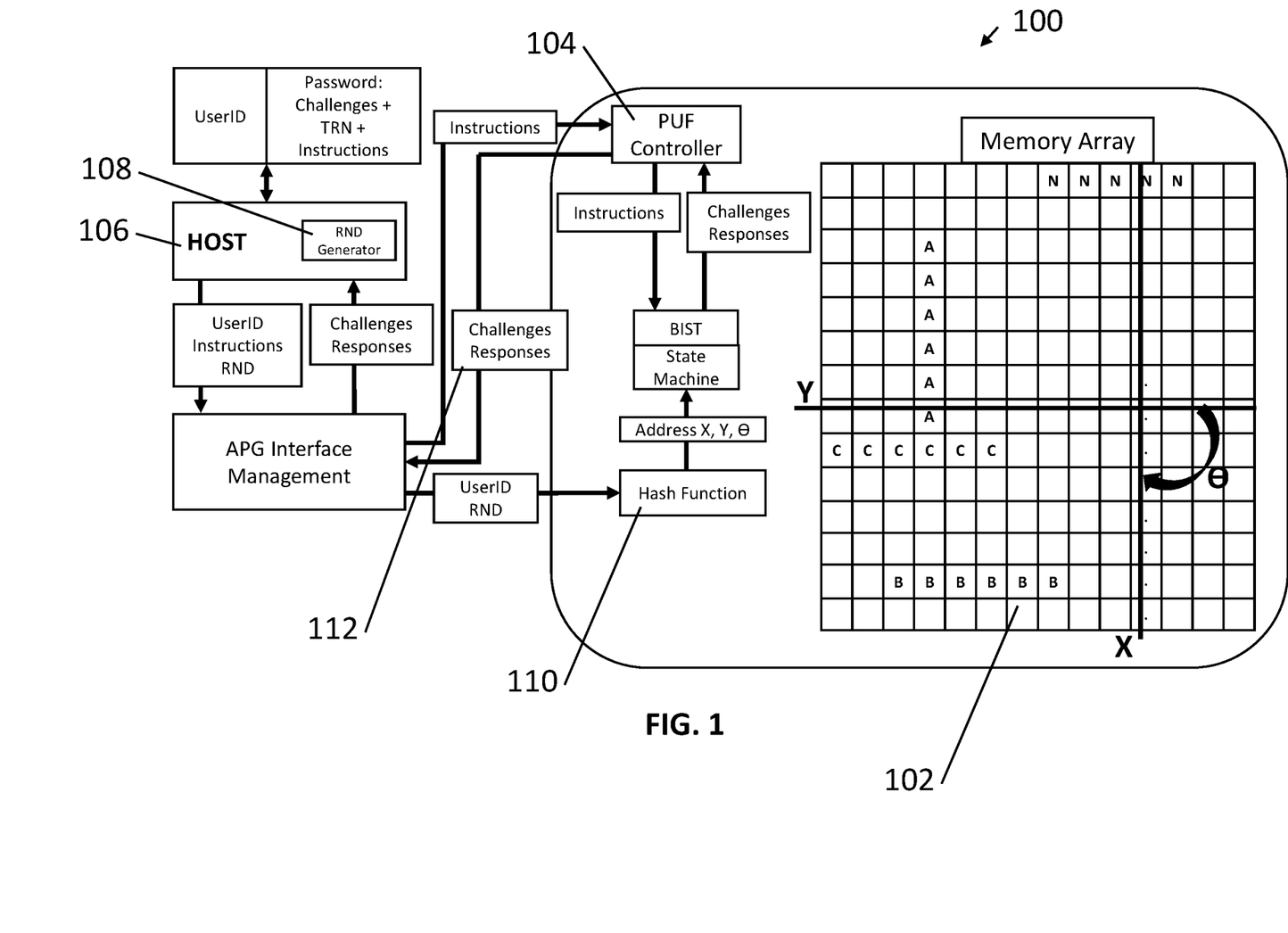
FIG. 1 depicts a block diagram describing the addressable PUF generator (APG) architecture.

In several embodiments, APGs are based on arrays of addressable PUFs. Distributed elements do not need to have the capability to store or memorize authentication patterns because they can be stored within a secure host server. The APG can generate fresh patterns during authentication to check the matching with previously distributed reference patterns. The block diagram of one embodiment of such an APG architecture with a memory array is shown in FIG. 1. System 100 includes an array 102 of PUFs that can each be access and values retrieved therefrom. Each PUF in array 102 is located at a particular address within array 102. PUF controller 104 access array 102 to retrieve values (e.g., challenge or response values) from particular PUFs located within array 102.

Host 106 can drive a hash function with a random number generated by random number generator 108 to find a particular address (for example, X, Y, θ) of a PUF within the array 102. A hash function 110 may generate fixed size data streams that have fixed output length, regardless of the size of the input, which point directly to an address in the memory array 102. In one embodiment, a PUF may consist of 128 to 256 cells that are tested using a particular instruction set. The resulting data streams (i.e., challenges) 112 are then transmitted to the secure server computer for future authentication.

During authentication of a particular device or distributed element, a process similar to the one described during challenge generation is repeated. A fresh data stream generated by the APGs (i.e., response) is transmitted to a secure server to be compared with the reference (challenge). After error correction, if the remaining CRP error rates are low enough, the authentication is positive. Using this method, a memory array may be a very economical way to design large arrays of PUFs and APGs.

Figure 2:
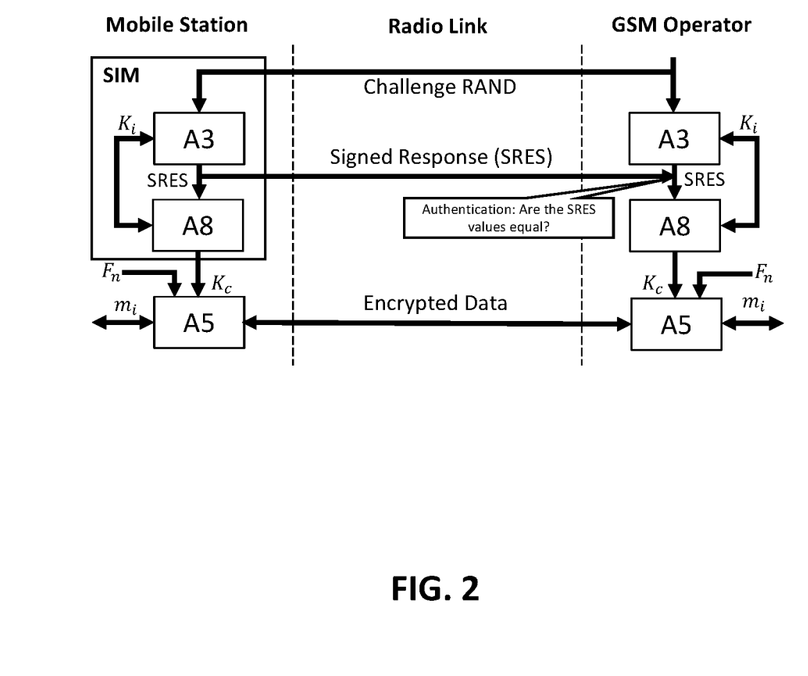
FIG. 2 depicts a security architecture of a GSM wireless system.

The conventional security architecture of contemporary wireless systems have notable security limitations in light of the PUF-based method described herein. This includes the 2nd generation Global System for Mobile Communication (GSM) and the variations towards developing the most recent security algorithms used in the 4th generation Long-Term Evolution (LTE). The LTE system is also called Evolved Packet System (EPS). The security mechanism in wireless systems essentially relies on using the Subscriber Identity Module (SIM card) which is a small processing board consisting of a CPU, memory (e.g., ROM, EPROM, RAM, flash), and other necessary peripherals (PLL, Crypto-processor, UART, etc.) implemented in a tiny microchip. A SIM card is a special category of smart cards configured to host a wireless network subscriber's unique identification, such as international mobile subscriber ID (IMSI), security keys (e.g., Ki), personal information (phone book, text messages) and other information required for connectivity and mobility (e.g., Public Land Mobile Number (PLMN), location information (Loci), Cell ID, and preferred network list). SIM cards with STK capabilities can also be used to develop new SIM-based value added services (e.g. mobile banking). An important property of a SIM card (and a smart card in general) is that its memory is not directly accessible and the stored information encoded within the card is available only by serial communications through an input/output pin with specific commands. This property provides security of secret information stored in a SIM card, since there is no standard command to read the secret keys from the SIM card. The block diagram in FIG. 2 demonstrates the security architecture of a GSM network.

In the GSM network, an authentication triplet is composed of three numbers (random number (RAND), signed response (SRES), and Kc). In one embodiment, a 128-bit randomly generated secret key ($K_i$) is assigned to each user to be used for authentication during the key's lifetime. The key $K_i$ is programmed in the SIM card along with other personal information during the personalization phase and is never exchanged in the air interface through radio channels. This key is not readable from the SIM card by standard read commands. This key is stored in a secure data base called Authentication Center (AuC) in the network as well. The authentication procedure initiates when a mobile user requests to access the network resources (e.g., when the user turns on his cell phone or when he moves to a new location area). This procedure also executes periodically by the network to filter out illegitimate fake users with invalid secret keys. The network first generates a 128-bit random number (RAND) and sends it to the user through air interface. The AuC runs A3 algorithm with $K_i$ and RAND as its input to generate a 32-bit expected signed response (XRES). The SIM card runs the same A3 algorithm based on its local copy of $K_i$ and the received RAND to generate the SRES. The SIM card transmits back the SRES to the network and if it matches the copy generated by the network (XRES), then the authentication succeeds, and access is granted to the SIM Card; otherwise, the authentication is deemed failed. Each (RAND, SRES) pair is typically used only once, and it is technically impossible to exploit the secret key $K_i$ from a few copies of (RAND, SRES) pairs; hence, it is useless for eavesdroppers to intercept the air interface.

In another embodiment, an A8 algorithm is executed independently by the network and the SIM card to generate a session ciphering key $K_c$ from $K_i$ and RAND. $K_c$ is combined with the air interface frame number (FN) and then is used by the ciphering algorithm (A5) in order to encrypt the voice data exchanged in the air interface, if the ciphering mode is activated. This mechanism is secure enough provided that the A3/A8 algorithm is irreversible such that extracting $K_i$ from publically exchanged (RAND, SRES) pairs is technically impossible. However, there are some other security vulnerabilities in this approach. One potential threat is the weak cipher renegotiation and the null cipher attacks such that a fake network station enters the negotiation phase and turns off the ciphering mode before the actual network station sends the ciphering-on command.

A similar problem is called Man in the Middle (MitM) attack via rogue base stations in femtocell networks. These problems are solved by a two-way authentication mechanism introduced in the LTE system. SIM cloning poses another threat since running the A3/A8 algorithms multiple times can reveal the secret key $K_i$. The inventive method eliminates the possibility of SIM cloning and improves on the network and SIM Card security levels by using the addressable physically unclonable functions generators (APGs). The core of the security architecture in the contemporary LTE systems is adopted from GSM with some important modifications. The first modification uses stronger algorithms at different levels. For example, the authentication algorithms in the GSM system (COMP128 implementations versions 1 to 4) are replaced with a stronger series of EPS integrity algorithms (EIA) captioned f1 to f5 (FIG. 3). Additionally, the EPS encryption algorithm (EEA) is substantially improved by using Advanced Encryption Standard (AES)-based symmetric ciphering algorithms. The EIA/EEA algorithms are currently available in three versions (1, 2, 3) and implemented respectively based on SNOW 3G, AES (used in USA), and ZUC (used in China).

Figure 3A:
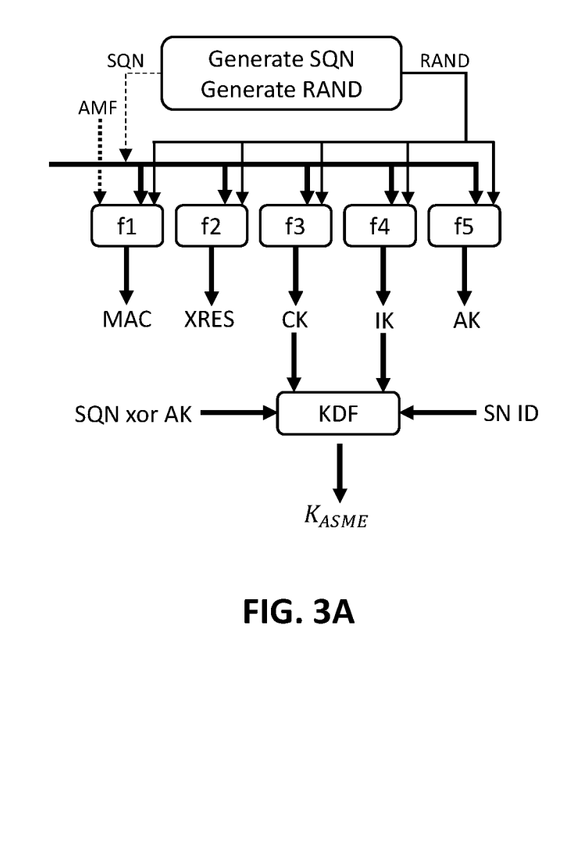
FIGS. 3A and 3B depicts security architecture implementations of an LTE wireless system.
Figure 3B:
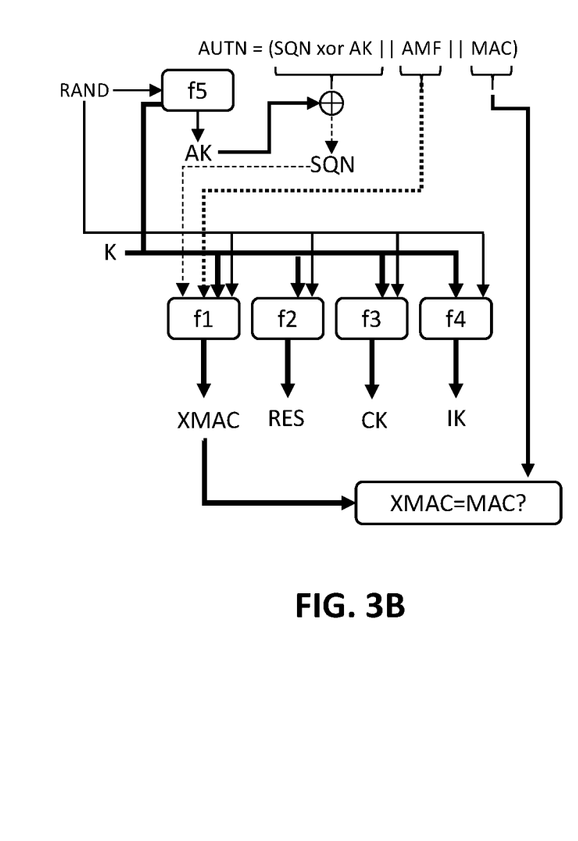

In addition to using enhanced algorithms in LTE, a two-way authentication is used to prevent fake base stations from taking over the system. In this approach, the network agent and the SIM card authenticate each other—FIGS. 3A and 3B depict the authentication procedures that may be executed by the network agent and SIM card. The first step is to authenticate the network by the SIM card. To do so, a random number RAND is generated by the network and is sent along with other security input, such as sequence number (SQN) and Authentication Management Field (AMF), to the SIM card.

Both the network agent and the SIM card execute algorithm f1 to generate a response referred to as the Message Authentication Code (MAP) from the RAND, a master key (K), SQN, and AMF. The network shares the calculated XMAP with the SIM card. The SIM card compares the calculated MAP with the XMAP version provided by the network; if they match, the network is validated. The subsequent phase is to validate the SIM card. To do so, the SIM Card calculates the SRES by applying an f2 algorithm on the RAND and the local copy of $K_i$ and sends it to the network. If the value matches the version calculated by the network (XRES), the SIM Card is validated, and access is granted.

Similar to session encryption key $K_c$ in GSM, the required session encryption key as well as other required security keys (CK, IK, AK) are generated by the network and the SIM card independently by applying f3, f4, and f5 algorithms on the same set of common inputs (K and RAND). FIGS. 3A and 3B depicts sequences of this procedure according to 3GPP TS 33.401 standard. Again, the weaker link in the protocol is the potential exposure of the secret $K_i$ to a hacker. The utilized f1 to f5 algorithm in LTE systems are robust to channel interception security attacks due to their intrinsic complexities, irreversibility properties, and the high entropy of their outputs. However, the whole security protocol is reliant on the keys that are physically stored as bit streams in conventional memories in both the SIM card and the Authentication Center. Therefore, leakage of information from the network database as well as potential SIM card cloning by side-channel attacks or manual interventions deteriorates the whole security of the system. The inventive method using addressable PUF generators is intended to be a remedy of this weak spot.

The methods disclosed herein are based on the replacement of the hackable storage of secure keys in the distributed elements by arrays of addressable PUF generators which do not have storing capabilities. These methods also replace the current method of single static master key per user with a dynamic key assignment generated by the APGs.

Traditional authentication mechanisms can be combined with hash functions on both the network and the user sides referred as AAH (APG-based Authentication and Hashing). The secure protocols have two steps: personalization and authentication.

According to one embodiment, during the preliminary personalization step, a device (e.g., a distributed element) generates a number of PUF challenges by sequentially accessing the arrays of its APG. This series of challenge values can then be provided to the network (e.g., to a server computer of the network) to operates as the network's secure key database. The large number of secure keys thereby generated are stored in a secure network, however they are not stored in the distributed elements.

Following execution of the personalization step, during authentication of a particular distributed element at a particular time, new PUF responses generated by the distributed element's APG can be transmitted to the server computer, enabling the server computer to compare the new response value to a corresponding challenge value that was generated and stored on the server computer during the preceding personalization step. When the server computer determines that the challenge-response-pairs (CRPs) match, there is positive authentication and the server computer can be designated as an authenticated device. The process can be reversed enabling the network to authenticate itself to a particular distributed element. This second step is to be repeated as often as necessary to secure the network. Typically, the initial personalization step is conducted in a secure environment, while the authentication steps may be conducted in an exposed environment using, in some cases, conventional communication channels between the network (e.g., a server computer of the network) and a particular distributed element.

Figure 4A:
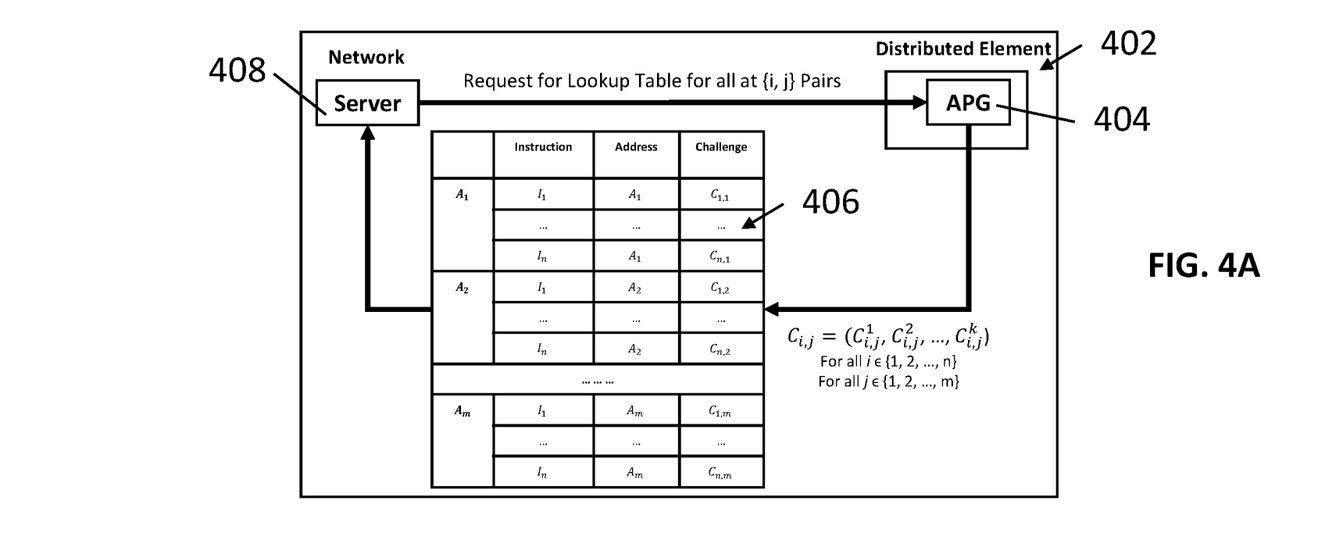
FIGS. 4A and 4B depicts sequences for generation of a look-up table derived from a distributed elements' APG and use of the look-up table for implementing authentication.

It is possible for a distributed element to provide its own lookup table to a server computer without utilization of a hash function. For example, FIG. 4A depicts distributed element 402 accessing its APG 404 to generate a lookup table 406 storing challenge values extracted out of the device's AGP 404. The lookup table includes, for each address (A) in the array making up APG 404, a challenge value (C) for the PUF at the corresponding location in the APG 404. Additionally, the lookup table includes, for each address in APG 404, a set of instructions (I) that can describe the approach for how a PUF located as the address should be accessed the challenge value read from the PUF. A depicted by the lookup table of FIG. 4A, a particular address A may include a number of different PUFs, enabling a single address to be used to generate a challenge value including a relatively large number of bits.

Once generated, the lookup table 406 is transmitted to and stored in a secure memory of server computer 408 at the network level during step-1 of the authentication process (i.e., the personalization step). The server sends a set of instructions I at the addresses A to generate and retrieve the PUF challenges C located in the array of the APG of the distributed element with each challenge C being a bit (0 or 1). The size of each PUF is the number of bits.

Figure 4B:
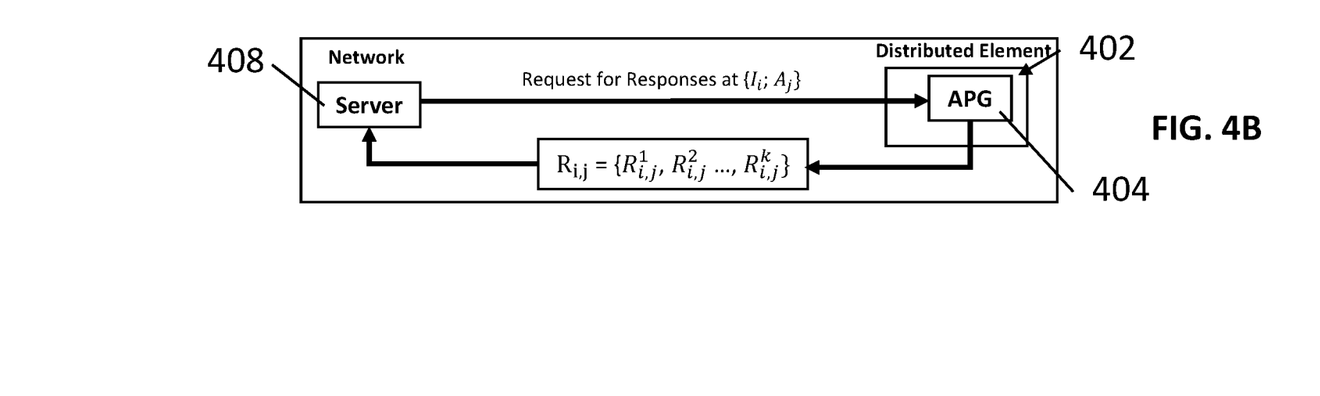

Following the look-up table transfer of the personalization step depicted in FIG. 4A, for any step-2 authentication, the server computer 408 then queries the distributed element 402 with a particular pair of instruction/address {I, A}, as depicted in FIG. 4B. The PUF responses R are generated by distributed element 402 accessing the PUF array of APG 404 using the particular instruction/address pair {I, A} provided by server computer 408. Once generated, the PUF responses R are transmitted to server computer 408 by distributed element 402. The server computer 408, upon receipt of the PUF responses R can then compare the set of challenge-response-pairs {C, R} with an error correcting method. Positive authentication occurs only if the CRP error rate is low enough and the challenge-response-pairs are considered to match one another.

During different authentication procedures, different instruction/address pairs can be used by the network at each authentication step to authenticate distributed element 402 to strengthen the security of the method. In such case, one or more of the distributed element 402 and server computer 408 (e.g., network) may keep track of all previous pairs of instruction/address to ensure that they are not used twice in different authentication procedures.

Figure 5A:
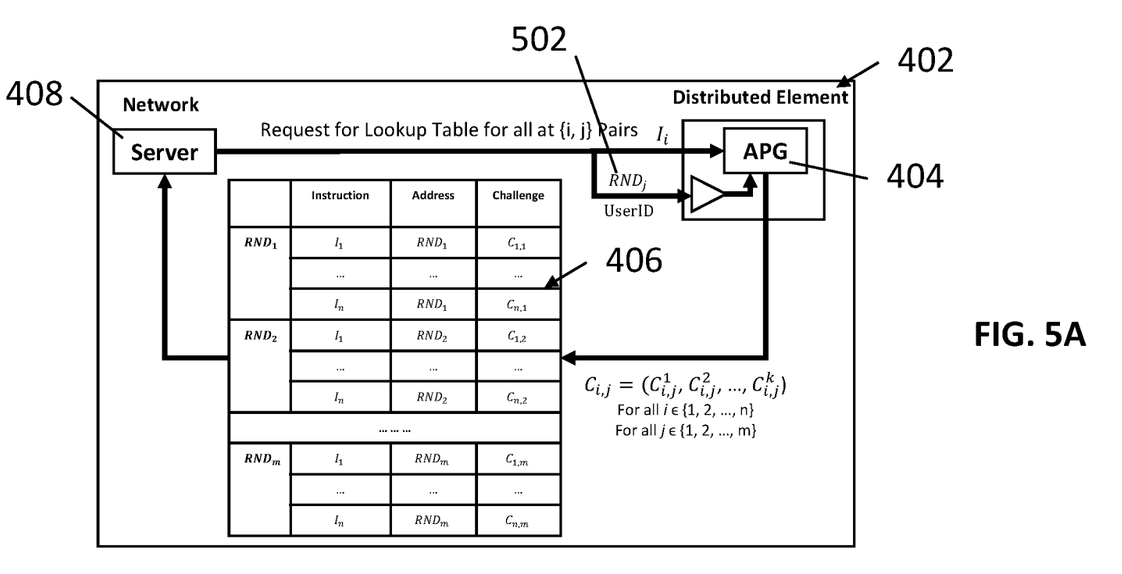
FIGS. 5A and 5B depicts sequences for generation of a look-up table derived from a distributed elements' APG and use of the look-up table for implementing authentication using a hash for security.
Figure 5B:
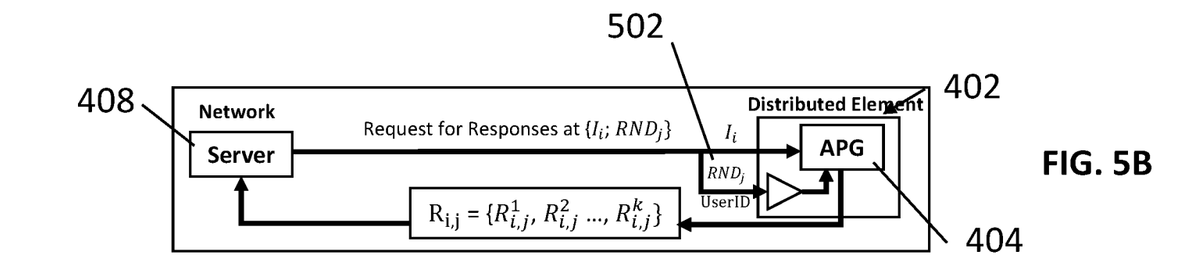

An alternative embodiment of the personalization and authentication procedures depicted in FIGS. 4A and 4B incorporates a hash function to provide enhanced security. These modified personalization and authentication procedures are depicted in FIGS. 5A and 5B, respectively. Hash functions are irreversible one-way, cryptographic functions. In such an embodiment, a hash function capability may be inserted in the distributed element. Considering that each distributed element has its own user ID, a particular random number 502 presented at the input side of the hash function results (which is incorporated in distributed element 402 and not depicted in FIG. 5A or 5B) at a particular address in the array of APG. Any hash function may be used in this architecture. An address in the APG cannot disclose the random number that was used to find the address. This feature is designed to enhance the level of security. And, as such, the random number may operate as a security key.

As in the case of the procedure depicted in FIG. 4A, during the personalization step, the server computer 408 downloads a lookup table 406 from each distributed element which contains instructions, random numbers, and resulting challenges. For this purpose, the server computer 408 sends a set of instruction/random number pairs {I, RND} to generate and retrieve the PUF challenges C located in the array of the APG of the distributed element 402, with each challenge C being a bit (0 or 1). The size of each PUF is the number of bits.

When implementing the authentication procedure (i.e., FIG. 5B) the server computer 408 queries the distributed element 402 with a particular instruction/random number pair {I, RND} (see "Request for responses" in FIG. 5B). The PUF responses R are generated from the array of the APG 404 of distributed element. The server computer 408 then compares the set of challenge-response-pairs {C, R} with an error correcting method. The server computer 408 determines that the distributed element 402 is authenticated if the CRP error rate is sufficiently low between the challenge and response values.

Different instruction/address pairs can be used by the network at each authentication step to strengthen the security of the method. In such case, the distributed element will keep track of all previous instruction/address pairs to ensure that they are not used twice.

The generation of a full lookup table during the personalization step (see, for example, the procedures depicted in FIGS. 4A and 4A), as described above, can be a relatively slow process. Generating PUF challenges from the array of APGs may be a limiting factor. To provide enough entropy, these lookup tables may also take an excessive amount of memory space at the network level—the network must store a lookup table for each distributed element configured to communicate with the network. An example embodiment using dynamic keys with a hash function may eliminate these two problems, but it may need to be complemented with additional security features to protect the communication distributed element network.

Figure 6A:
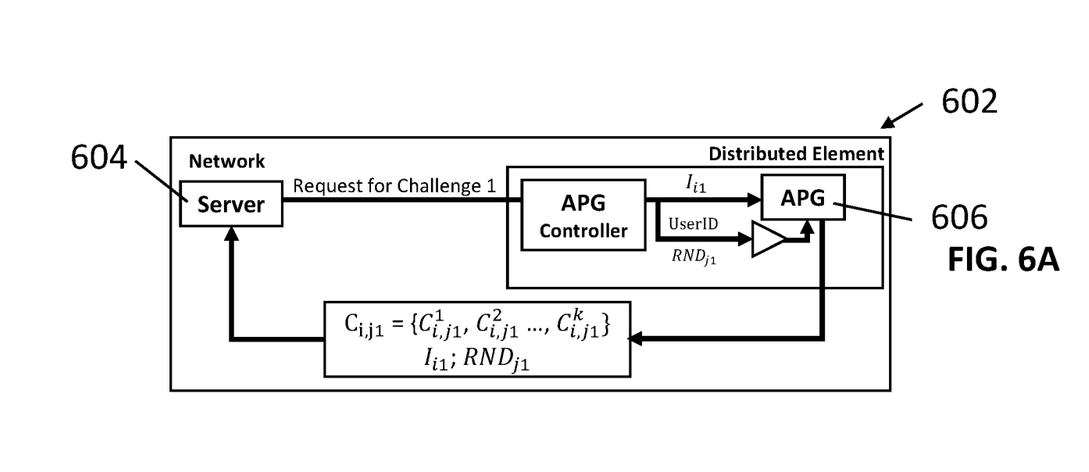
FIGS. 6A and 6B depict sequences for a dynamic key architecture utilizing a hash function.
Figure 6B:
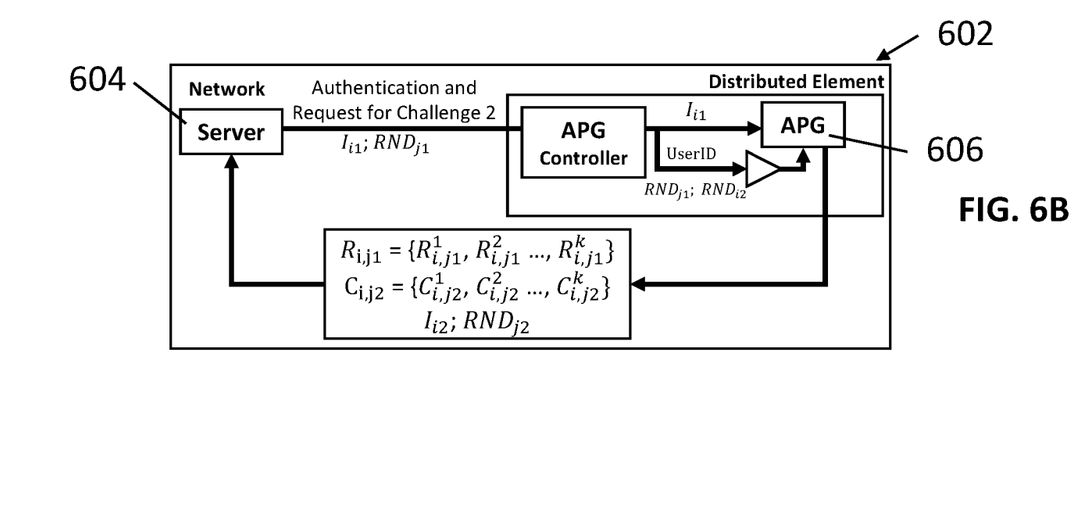

FIGS. 6A and 6B, for example, depict procedures for secure communications. During a preliminary personalization step depicted in FIG. 6A, server computer 604 transmits a request to distributed element 602 for a first challenge value. In response to that request, distributed element 602 accesses APG 606 to generate a first challenge value by accessing a first sequence of PUFs in the array of APG 606. The sequence of PUFs is accessed at beginning at a first location in APG 606 and according to a set of instructions. The instructions may specify a number of PUFs that are to be accessed in APG 606 starting at the first location to generate a first challenge value. In some embodiments, the instructions may also specify an angle (e.g., a direction within the array of APG 606) along which the PUFs should be access to generate the challenge value. Once the challenge value is created, distributed element 602 hashes the challenge value using the random number RND and transmits to the network (i.e., server computer 604) the challenge "1": $C_{i,j1} = \{C_{i,j1}^1, \ldots, C_{i,j1}^k\}$ with the instruction $I_{i1}$, and the random number $RND_{j1}$. In this manner the value RND operates as a password or security token securing the challenge value. This information is stored in a secure memory of server computer 604 of the network for future authentication.

During the first authentication step depicted in FIG. 6B, server computer 604 of the network transmits the instruction/random number pair $\{I_{i1}, RND_{i1}\}$ to distributed element 602. Distributed element 602 accesses APG 606 according to the instructions provided by server computer 604 in that request to generate the response $R_{i,j1} = \{R_{i,j1}^1, \ldots, R_{i,j1}^k\}$. Once generated, the response is transmitted to server computer 604 enabling server computer 604 to compare the received response to the originally-stored challenge. If the two values match to a sufficient degree, distributed element 604 may be determined to be authenticated. In addition, during this step distributed element 602 additionally accesses APG 606 to generate a second pair instruction/random number $\{I_{i2}, RND_{i2}\}$ for a second challenge "2", $C_{i,j2} = \{C_{i,j2}^1, \ldots, C_{i,j2}^k\}$. The second challenge is transmitted by distributed element 602 back to server computer 604 wherein the second challenge is stored in a secure storage device and may be utilized for future authentication.

During subsequent authentication steps, new instruction/random number pairs are generated by distributed device 602 with new challenges such that the challenges are refreshed at every cycle.

Figure 7A:
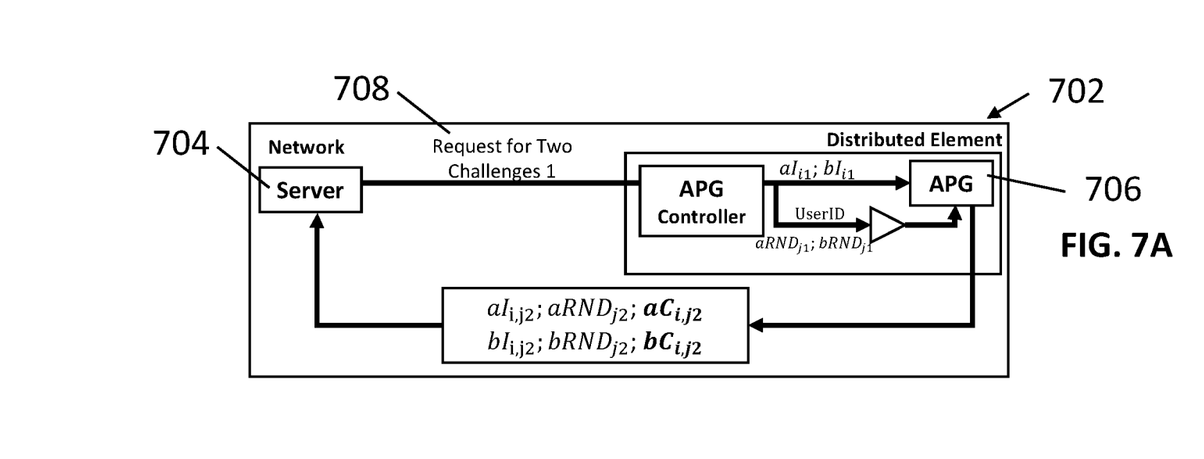
FIGS. 7A and 7B depict sequences for a two-way authentication protocol.
Figure 7B:
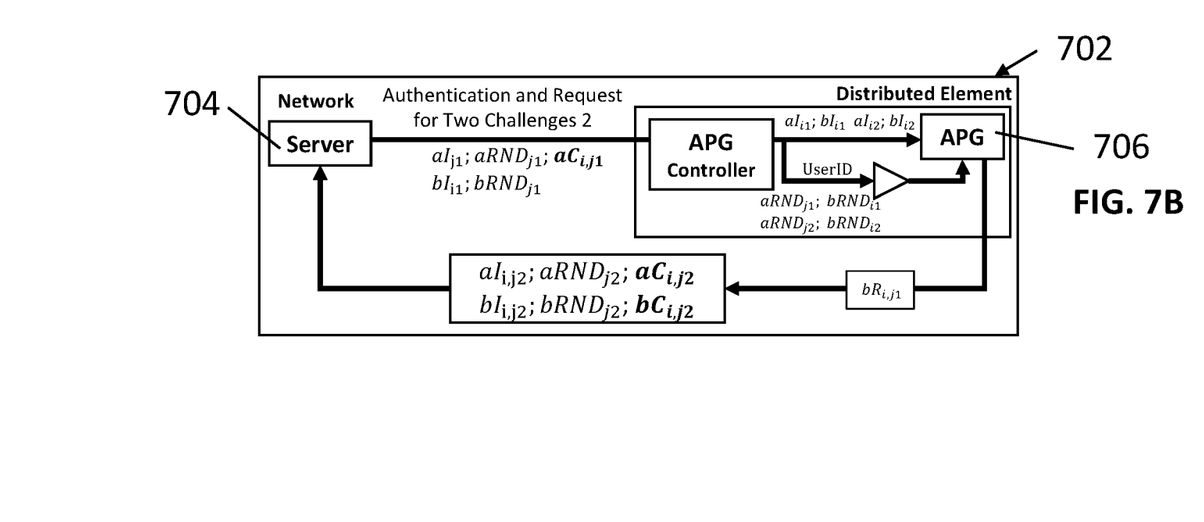

In embodiments, a two-way authentication protocol may be implemented for secure communications. Such a protocol may be combined with any of the methods disclosed above and is depicted in FIGS. 7A and 7B. The protocol includes two cycles: a first cycle to authenticate the network with challenges "a", and a second cycle to authenticate the distributed element with challenges "b".

During the personalization procedure depicted in FIG. 7A, secure server computer 704 of the network requests two sets of challenges 708 from distributed element 702. In response, distributed element 702, as described herein, accesses APG 704 to generate to separate challenge values that are transmitted to server computer 704 for future authentication: $aC_1$ (together with the instruction/random number pair {aI, aRND}) and $bC_1$ (together with the instruction/random number pair {bI, bRND}). The two challenge values can then be stored by server computer 704 and, as described below, utilized to later implement secure communications with distributed element 702.

During a first authentication step, as depicted in FIG. 7B, server computer 704 transmits to the distributed element 702 the challenge value $aC_1$ (together with the instruction/random number pair {aI, aRND}. Distributed element 702 then accesses APG 706 with the instruction/random number pair {aI, aRND} to generate an associated response value $aR_1$. The response $aR_1$ generated by distributed element 702 is then is compared to $aC_1$ (the challenge provided by server computer 704) by the distributed element 702 to authenticate the network (if the two values match or are sufficiently close to one another. At this point, assuming the values match, distributed element 702 has authenticated server computer of 704 of the network. But, at this point, server computer 704 still needs to authenticate distributed element 702.

Accordingly, distributed element 702 generates an additional response $bR_1$ by accessing APG 706 using the instruction/random number pair {bI, bRND}. Distributed element 702 then transmits the response $bR_1$ to server computer 704 of the network. Server computer 704 can then compare the response $bR_1$ to the stored challenge $bC_1$ to authenticate distributed element 702. Assuming the challenge and responses match (or are sufficiently close to one another), server computer 704 determines that distributed element 702 is authenticated.

Following that initial authentication, distributed element 702 may transmit a new set of challenges to server computer 704 of the network for future authentication. As depicted in FIG. 7B, challenge aC2 (together with the instruction/random number pair {aI2, aRND2}) and bC2 (together with the instruction/random number pair {bI2, bRND2}) are transmitted to server computer 704 by distributed element 702. This process may then be repeated at each subsequent authentication cycle to continually replace the challenges stored by server computer 704 accordingly as they are used to authenticate distributed element 706.

This method, in which two challenges are extracted from the lookup table at every authentication cycles, may be implemented in accordance with or in addition to the methods described previously.

Figure 8:
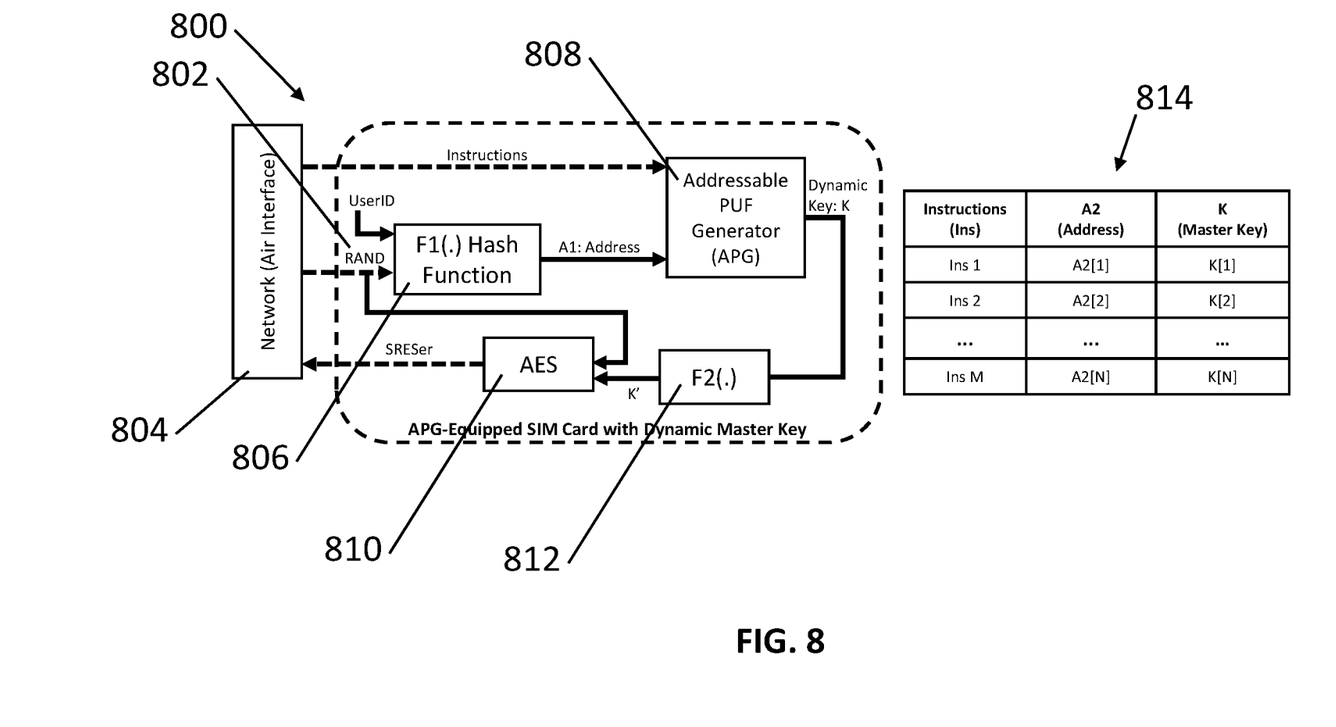
FIG. 8 depicts an example security system on a SIM card.

An example application of these methods may be illustrated in relation, for example, to SIM cards or other secure memory systems. If hackers were to penetrate the SIM card memory by physical probing or by a side channel attack (e.g., differential power analysis) and obtain the user's master key (K), the security of the secure memory system breaks down. But, in some cases, the methods disclosed herein may be implemented to protect the SIM cards against such detrimental threats by replacing a static master key utilization with a dynamic K table. These keys may be generated from PUF challenges with APGs, replacing the conventional storage method that is susceptible to hacking. An example of such a secure memory system 800 implemented in accordance with the present disclosure is depicted in FIG. 8.

When the authentication procedure is initiated (in response to a user's request to register to the network), a one-time random number (RAND) 802 is generated by the network and is sent to the user through air interface 804 (e.g., a wifi communications interface configured to communicate wirelessly with the network). This number may be received by the air interface 804 and is transparently delivered to the secure memory system (e.g., a SIM card). In contrast to the conventional methods, where authentication algorithms may be implemented using a static master key K, a dynamic key generation procedure is initiated in the proposed method. In this regard, a hash function $F_1$ 806 is applied to the received random number RAND and the user id (UID) of the secure memory to generate the address field $A_1$. For instance, if the memory-based PUF includes N different memory cells, the following hash function may be used:

$$A_1 = (\Sigma_{b=1}^{B1} \alpha_b \text{RAND}[b] + \Sigma_{b=1}^{B2} \beta_b \text{UID}[b]) \bmod N$$

$$\text{RAND} = (\text{RAND}[1], \text{RAND}[2], \ldots \text{RAND}[b], \ldots, \text{RAND}[B1]), \text{UID} = (\text{UID}[1], \text{UID}[2], \ldots, \text{UID}[B2])$$

These are the Byte representations of the inputs RAND and UID. The integer-valued $\alpha_i$ and $\beta_b$ are arbitrarily chosen constant coefficients. Finally, (mod N) represents the reminder of the results when divided by the prime number N. For instance, consider the following quantities:

RAND=(10110101 01010101 01001110 10100001)$_{bin}$=(B5,55,8E,A1)$_{hex}$

UID=(11110010 01010101 00111010 00010011 00000010)$_{bin}$=(F2 55 3A 13 02)$_{hex}$ $\alpha = (\alpha_1, \alpha_2, \alpha_3, \alpha_4)(1,3,5,7) \beta = \beta_1, \beta_2, \beta_3, \beta_4, \beta_5) = (9,7,5,3,1)$ and $P=4733$ The hash function maps the input to the following address:

$$A_1 = (\Sigma_{b=1}^{4} \alpha_b \text{RAND}[b] + \Sigma_{b=1}^{5} \beta_b \text{UID}[b]) \bmod 4733 = (2273+3122) \bmod 4733 = 662.$$

Subsequently, APG 808 generates a PUF challenge value at the location $A_1$ using and according to the instructions provided by the network. The resulting APG challenge value is a data stream that plays the role of a dynamic master key K as would be found in a conventional system. In order to generate challenges from the PUF-based memory cells, the ternary representations of the cells may be used along with the instructions provided by the network. Challenges are generated from the cell contents until the required number of bits for the master key K (e.g., 128 bits for an LTE system) are collected. Then, this master key is used as input to the authentication algorithm (e.g., AES block 810) to generate the signed response SRES. Table 814 shown in FIG. 8 depicts a listing of master keys K that may be generated in this manner in combination with the address A and instructions I utilized to generate the corresponding master key K. This key (SRES) may also be used to generate the required encryption or other additional security keys (e.g., $K_c$ in the GSM and XMAC, CK and IK in the LTE system).

Additional correcting methods such as the use of ternary state can discard the shakier readings represented by x and include only the robust bits represented by "0" and "1" in forming the dynamic master key, hence the device is robust to minor variations of the PUFs physical characteristics due to environmental condition changes.

In order to make the resulting key even more robust in the presence of undesired PUF characteristic variations, the smoothing function $F_2$ ( ) 812 can be used. As a practical embodiment, repetition codes of size 3 may be used. In this method, smoothing function $F_2$ ( ) 812 may be configured to only read the 3 consecutive zeros and ones and discard the remaining intermediate bits, such that the APG readings includes only "000" and "111" patterns and its length is 3 times more than the length of the master key length. Subsequently, it is possible to map the pattern "000" to "0" and the pattern "111" to "1". With this method, the matching is robust to one bit flipping due to undesired variations. The following example illustrates this algorithm for an 8-bit key K. The APG challenge at location $A_1$=662:

01xx011000x111010xx0x010000x01x0x1111x00x1x11 xx00x010x001x

Step 1: Discard the shaky bits represented by x:
01011000111010001000001011110011100010001
Step 2: Read the consecutive 000 and 111 and discard the remaining bits:
01011000111010001000001011110011100010001
000, 111, 000, 000, 111, 111, 000, 000
Step 3: Map ("000"→"0", "111"→"1") to obtain the secret key K'
K'=0, 1, 0, 0, 1, 1, 0, 0

The advantage of this method is that if a few of the cell contents are in-error such that only one out of the three consecutive bits are flipped, the resulting secret key K' remains unchanged. For example, the following response results in the same key. The APG reading at location $A_1$=662:

01x0011000x111010xx0x010000x01x001111x00x1x11 xx00x0x0x0010

Step 1: Discard the shaky bits represented by x:
0100110001110100010000010011110011100000010
Step 2: Read the consecutive 000 and 111 and discard the remaining bits:
0100110001110100010000010011110011100000010
000, 111, 000, 000, 111, 111, 000, 000

Step 3: Map ("000"→"0", "111"→"1") to obtain the secret key K'

K'=0, 1, 0, 0, 1, 1, 0, 0

Using longer patterns (e.g., repetition codes of lower rate ⅕, ⅐) can enhance the robustness of the produced key at the cost of a longer time required to read the master key by APG.

In this method, each user-specific SIM card may be equipped with an unclonable APG device. During device personalization, as discussed above, all possible cell contents at every possible P locations in the device's APG can be read and stored at a lookup table in the AuC database as a reference to authenticate the SIM Card. Since the SIM master key is not stored as a conventional bit stream in the memory but rather as physical characteristics of a resistive ram device (that is, the APG), the SIM card is technically unclonable. Further, due to using dynamic key generation method, even if one Key is hacked by a hacker the SIM card may still be considered secure. Even though forming this lookup table can be time-consuming, the step is only undertaken a single time (i.e., at device personalization) during the SIM personalization phase.

A two-way authentication mechanism can be implemented as an additional security measure. For a successful authentication, both a SIM card and a network station should authenticate the other partner. Since a network can also be protected by APG technology, it is unclonable and a fake server cannot penetrate the developed security mechanism. In other words, the communication link has two partners (a network and a SIM card). The secret keys for each partner is hidden and implemented by an unclonable device and a corresponding table is programmed at its counterpart. Breach of information from one lookup table is not sufficient to accomplish a successful authentication.

In embodiments, a cryptographic protocol between a network and distributed elements which contain arrays of addressable PUF generators that operate in the following way. During the personalization step, or initial set up, lookup tables containing the various challenges of the various PUFs for each addressable PUF generators are downloaded in the memory of the network. At least one array of addressable PUF generators is part of each distributed element that are secured by the method. These lookup tables are organized by instruction set and address in order to be able to identify the origin of the PUF challenges within the array of addressable PUFs. During the authentication steps, the network queries the distributed element with a task to generate PUF responses from the array of addressable PUF generator with a particular instruction set and address that is documented in the lookup table. If the responses are relatively similar with the corresponding challenges the authentication is judged positive. The following authentication cycles can use different instruction set and addresses that are part of the lookup table. The protocol may be modified to incorporate hash functions in each distributed element. The hash function used in the protocols can be one-way cryptographic function converting the user ID of a distributed element and a particular random number into a particular address within the array of addressable PUF generator. The lookup tables can be organized by instruction set and random number.

In embodiments, a cryptographic protocol between a network and distributed elements may be implemented that contain arrays of addressable PUF generators and hash functions that operate in the following manner. During the personalization step, or initial set up, a set of challenges are generated at a particular address of the array of addressable PUF generator with a particular instruction set. This particular address can be extracted from the user ID of the distributed element and random numbers with a hash function. The challenges, instruction set, and either the address or random numbers are transmitted to the network for future authentication. During the authentication steps, the network queries the distributed element with a task to generate PUF responses from the array of addressable PUF generators with the particular instruction set and address or random number that was transmitted during personalization. If the responses are relatively similar with the corresponding challenges the authentication is judged positive. The following authentication cycles can use different instruction set and addresses or random number that can be generated from the arrays of addressable PUF generators.

In some embodiments, two sets of challenges are generated: the first set has the purpose to support subsequent authentication of the network while the second set of challenges has the purpose to authenticate the distributed elements. An additional APG may be part of the network to strengthen security. The distributed elements may be smart cards, SIM cards, banking cards, secure microcontrollers, Internet of Things, connected devices, ID cards, smart passports, transport titles, computers, workstations, telephones, smart phones, tablets, servers, base stations, or any other element connected to a physical cyber system. The protocols to find the address within an array of addressable PUF generators with a hash function include random numbers, pseudo random numbers, or true random numbers. The protocols may use custom or commercial hash functions such as MD-5 and SHA (Secure Hash Algorithm). The protocol may use the hash digest to describe how to find the location of a node related to User ID with parameters such as, not to be limited to, the coordinates X, Y in the array, the angle of detection, multiple locations spreads across the array that can be considered as a node, and a combination of these elements. The physical predictable properties of nodes that are associated with a particular physically unclonable functions such as SRAM memories, DRAM memories, Resistive RAM memories, magnetic memories, Flash memories, EEPROM memories, OTP memories, ring oscillator PUFs, gate delays oscillators, optical PUFs, sensors, and MEMS PUFs.

In some embodiments, the physical predictable properties are the result of physically unclonable functions with binary state, ternary state, quaternary state, or other multi-states. In some embodiments, the protocols can be combined with additional cryptographic protocols to secure the communication within the network, and transfer securely the information between the network and distributed elements. These additional protocols include, not to be limited by, public key infrastructure (PKI), use of private keys, use of symmetrical cryptography (e.g., DES, AES), and asymmetrical cryptography (e.g., RSA), secret key exchange methods (quantum cryptography, Elliptic Curve Cryptography (ECC)), hash function, and the use of biometric prints.

In an embodiment, a system includes a server computer, including a memory storing a look-up table including a plurality of data values, each data value being associated with an address value, and a first processor configured to access the look-up table to generate a challenge value based on a first data value associated with a first address value in the look-up table, and transmit a first message including the first address value using a communications network. The system includes a distributed element, including an array of physically unclonable functions, and a second processor configured to receive, from the server computer, the first message, generate a response value by accessing a first physically unclonable function located at the first address value in the array of physical unclonable functions, and transmit a second message including the response value, via the communications network to the server computer, wherein the first processor of the server computer is configured to compare the challenge value to the response value to determine whether the distributed element is authenticated.

In another embodiment, a method includes receiving, at a distributed element using a communications network and from a first device, a first message encoding a first address value, generating a response value by accessing a first physically unclonable function located at the first address value in an array of physical unclonable functions, and transmitting a second message including the response value, via the communications network to the first device, wherein the first device is configured to compare the response value to a challenge value to determine whether the distributed element is authenticated.

In another embodiment, a method includes generating a set of challenges at an address of an array of a physically unclonable function, receiving, from a distributed element, a set of responses in response to an instruction to generate the set of responses from the array of the physically unclonable function using at least one of an instruction set and address and a random number previously transmitted to the distributed element, and comparing the set of responses to the set of challenges to authenticate the distributed element.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A system, comprising:
a server computer, including:
a memory storing a look-up table including a plurality of data values, each data value being associated with an address value, and
a first hardware processor configured to:
access the look-up table to generate a challenge value based on a first data value associated with a first address value in the look-up table, and
transmit a first message including the first address value using a communications network; and
a remote computing device, including:
an array of physically unclonable functions, and a second hardware processor configured to:
receive, from the server computer, the first message,
generate a second response value by accessing a first physically unclonable function located at the first address value in the array of physical unclonable functions, and
transmit a second message including the response value, via the communications network to the server computer, wherein the first processor of the server computer is configured to compare the challenge value to the response value to determine whether the remote computing device is authenticated,
wherein the plurality of data values, each data value being associated with an address value, reflect previously generated response of elements of the array of physical unclonable functions.

2. The system of claim 1, wherein the first processor is further configured to determine a security value associated with the remote computing device and wherein the first message is at least partially encoded using the security value.

3. The system of claim 2, wherein the remote computing device is configured to encode the second message using the security value.

4. The system of claim 1, wherein the second processor is configured to generate the response value by accessing a sequence of physically unclonable functions in the array of physically unclonable functions along an angle in the array.

5. The system of claim 4, wherein the first processor is configured to include an identification of the angle in the first message.

6. The system of claim 1, wherein the challenge value includes a stream of data including ternary data and the first message identifies locations of values in the challenge value having a third state in a set of ternary states.

7. The system of claim 1, wherein the remote computing device is at least one of a smart card, SIM card, banking card, secure microcontroller, Internet of Things device, ID card, smart passport, transport title, computer, workstation, telephone, smart phone, tablets, server, and base station.

8. The system of claim 1, wherein the first physically unclonable function includes at least one of SRAM memory, DRAM memory, Resistive RAM memory, magnetic memory, Flash memory, EEPROM memory, OTP memory, a ring oscillator, a gate delays oscillator, and a sensor.

9. A method, comprising:
receiving, at a remote computing device using a communications network and from a first device, a first message encoding a first address value;
generating a response value by accessing a first physically unclonable function located at the first address value in an array of physical unclonable functions; and
transmitting a second message including the response value, via the communications network to the first device, wherein the first device is configured to compare the response value to a challenge value to determine whether the remote computing device is authenticated, and when the remote computing device is authenticated, to grant access to the communications network, wherein the challenge value is determined by a previously retrieved response value of a physically unclonable function in the array.

10. The method of claim 9, further comprising determining a security value associated with the remote computing device and wherein the first message is at least partially encoded using the security value.

11. The method of claim 10, further comprising encoding the second message using the security value.

12. The method of claim 9, further comprising generating the response value by accessing a sequence of physically unclonable functions in the array of physically unclonable functions along an angle in the array.

13. The method of claim 12, wherein an identification of the angle is encoded into the first message.

14. The method of claim 9, wherein the response value includes a stream of data including ternary data and the second message encodes locations of values in the response value having a third state in a set of ternary states.

15. The method of claim 9, wherein the first physically unclonable function includes at least one of SRAM memory, DRAM memory, Resistive RAM memory, magnetic memory, Flash memory, EEPROM memory, OTP memory, a ring oscillator, a gate delays oscillator, and a sensor.

16. A method, comprising:
Retrieving a set of challenges reflecting previously measured responses corresponding to an address of an array of a physically unclonable functions; receiving, from a remote computing device, a set of responses in response to an instruction to generate
the set of responses from the array of the physically unclonable function using at least one of an instruction set and an address and a random number previously transmitted to the remote computing device; and
comparing the set of responses to the set of challenges to authenticate the remote computing device.

17. The method of claim 16, wherein the remote computing device is configured to encode the set of responses using a hash function.

18. The method of claim 16, wherein the remote computing device is at least one of a smart card, SIM card, banking card, secure microcontroller, Internet of Things device, ID card, smart passport, transport title, computer, workstation, telephone, smart phone, tablets, server, and base station.

19. The method of claim 16, wherein the physically unclonable function includes at least one of SRAM memory, DRAM memory, Resistive RAM memory, magnetic memory, Flash memory, EEPROM memory, OTP memory, a ring oscillator, a gate delays oscillator, and a sensor.

20. The method of claim 16, wherein the physically unclonable function includes an element having a binary state, a ternary state, or a quaternary state.

* * * * *